No. 878,807. PATENTED FEB. 11, 1908.
F. KOCH.
VEHICLE PROVIDED WITH MOVABLE RAILS.
APPLICATION FILED OCT. 2, 1907.
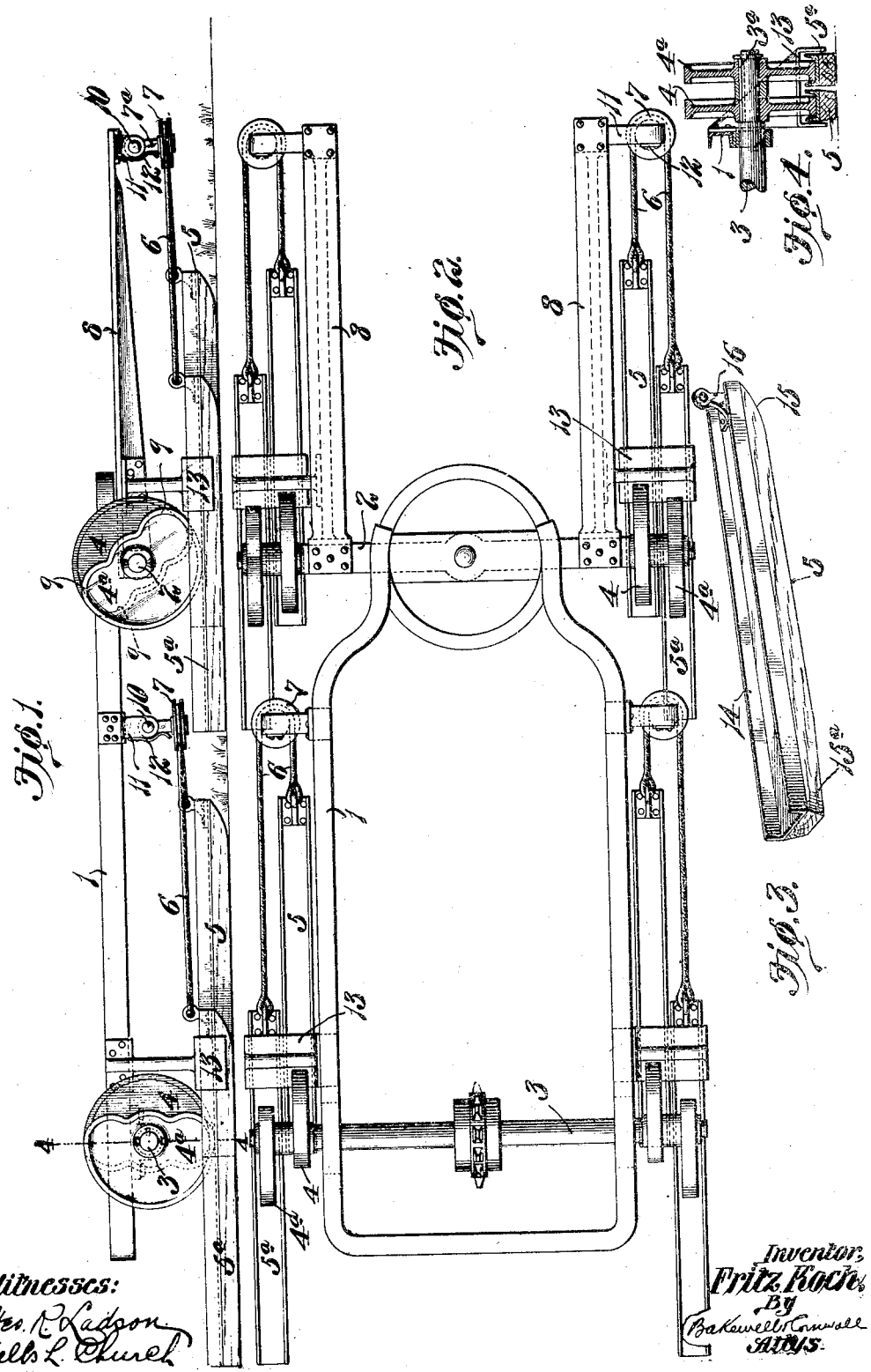

UNITED STATES PATENT OFFICE.

FRITZ KOCH, OF ST. PAUL, MINNESOTA.

VEHICLE PROVIDED WITH MOVABLE RAILS.

No. 878,807.  Specification of Letters Patent.  Patented Feb. 11, 1908.

Application filed October 2, 1907. Serial No. 395,646.

*To all whom it may concern:*

Be it known that I, FRITZ KOCH, a citizen of the United States, residing at St. Paul, Minnesota, have invented a certain new and useful Improvement in Vehicles Provided with Movable Rails, of which the following is a full, clear, and exact description, such as will enable others skilled in the art to which it appertains to make and use the same, reference being had to the accompanying drawings, forming part of this specification, in which,—

Figure 1 is a side elevation of a vehicle embodying the features of my invention; Fig. 2 is a top plan view of said vehicle; Fig. 3 is a perspective view of one of the rails; and Fig. 4 is a cross sectional view taken on the line 4—4 of Fig. 1.

This invention relates to a movable track for vehicles, traction engines or other machines that travel on wheels.

The object of my invention is to provide means for enabling a vehicle, traction engine or other machine to travel over soft or sandy soil without sinking into same.

Broadly stated, my invention consists in movable rails adapted to be arranged under the wheels of a vehicle, traction engine or other machine and means for automatically moving said rails forwardly or in the direction in which the vehicle travels so that the wheels of the vehicle will travel on a track that prevents them from sinking into the roadbed or ground over which the vehicle passes. Preferably, each wheel of the vehicle comprises a plurality of segmental-shaped sections that are arranged in different vertical planes and are connected together to form a complete circular wheel.

A rail is provided for each section of every wheel of the vehicle and the rails for each wheel are so connected with each other that when one section of the wheel is in engagement or is traveling on its coöperating rail, said rail will remain at rest, and the rail for the other section of said wheel will be moving forwardly to provide a supporting surface for said section when it comes into position; namely, when it arrives at the lower side of the wheel.

Referring to the drawings which illustrate the preferred form of my invention, 1 designates the frame of the vehicle and 2 and 3 designate, respectively, the front and rear axles of the vehicle. The term "vehicle", as herein used, is intended to include a traction engine or any form of machine which travels on wheels so that when I use the term "vehicle" I do not wish to be understood as limiting my invention to a conveyance for carrying people or merchandise.

Each wheel of the vehicle is herein shown as composed of two segmental-shaped sections 4 and 4$^a$ located in different vertical planes and so arranged relatively to each other that they will form a perfectly circular wheel. The sections of each wheel are connected together or in case the vehicle is provided with a rear axle drive, as herein shown, the sections of the rear wheels will be firmly secured to the rear axle, as for example, by keys 3$^a$, as shown in Fig. 4.

The vehicle herein shown is provided with movable tracks for both the front and rear wheels but it will, of course, be understood that a track could be provided for only one set of wheels of the vehicle without departing from the spirit of my invention.

Rails 5 and 5$^a$ are provided for the sections 4 and 4$^a$, respectively, of each wheel, and each rail is of equal or greater length than the periphery of its coöperating wheel section. The rails 5 and 5$^a$ for each wheel are secured to the opposite ends of a flexible member, preferably a cable 6, that passes over a guide, herein shown as a pulley 7. The guides 7 for the flexible connecting members of the rails for the front wheels are carried by supports 8 that project forwardly from the front axle 2 to which they are permanently connected, and the guides 7 for the connecting members 6 of the rails for the rear wheels are carried by the frame 1 of the vehicle, said guides being located some distance in front of the rear axle.

When the vehicle is traveling along and the wheels are in the position shown in Fig. 1, the wheel sections 4$^a$, which are at the lower sides of the wheels, will travel longitudinally over the rails 5$^a$, which, of course, remain at rest on account of the weight on same, and the rails 5 for the other wheel sections will be pulled forwardly by the flexible connecting members 6 that pass over the guides 7 which move with the vehicle, the sections 4 which coöperate with said rails 5 being at the upper sides of the wheels and consequently out of engagement with said rails 5. As the wheel sections 4$^a$ pass out of engagement with their coöperating rails 5$^a$, the wheel sections 4 come into engagement with their coöperating rails 5 and thus hold said rails 5 at rest during the time they are moving longitudinally over same, thereby causing the rails 5ᵃ to be drawn forwardly so as to be in position to receive the wheel sections 4ᵃ when they again come into operative position at the lower sides of the wheels. As shown in dotted lines in Fig. 1, the terminals of the sections 4 and 4ᵃ of each wheel overlap slightly and are curved at 9 so that one section will pass into engagement with its coöperating rail, slightly before or at approximately the same time the other section passes out of engagement with its coöperating rail. Consequently there is a short period, practically only a second or two, however, in which both wheel sections will be in engagement with their coöperating rails and thus hold both of said rails at rest simultaneously. To compensate for this and prevent the connecting members 6 from being stretched or broken, I have mounted the guides 7 for said connecting members in such a manner that they can yield or move rearwardly slightly when both of the rails are held stationary, said guides being carried by members 7ᵃ that are pivotally connected at 10 to brackets 11 and each of said brackets is provided with a leaf-spring 12 that bears against the member 11 to hold its guide 7 in normal position.

The rails 5 and 5ᵃ for the sections of each wheel are arranged parallel to each other, as shown in Fig. 2, and are maintained in such position by means of guides 13 which embrace each pair of rails. These guides 13 may be of any preferred construction and may be located at any suitable point. The guides herein shown are cast members and those for the front wheels are arranged slightly in advance of same and are carried by the supports 8 which project forwardly from the front axle 2, the guides 13 for the rails of the rear wheels being arranged in front of said wheels and carried by the frame 1. The rails also may be of any preferred design, those herein shown consisting of a commercially rolled channel 14 having a timber 15 secured to the underneath side thereof. The underneath surface of the front end of said timber is inclined upwardly or rounded off, as shown in Fig. 3, so that it will travel easily over obstructions and the side faces of the rear end portion of said timber are beveled inwardly at 15ᵃ.

At the front end of the channel is a casting 16 to which the flexible connecting member 6 is secured. The upwardly projecting legs or flanges of the channel 14 positively prevent the wheel sections from jumping off the rail but said flanges are not absolutely necessary as the wheel sections could travel on perfectly flat or unflanged rails. Furthermore, instead of providing two rails for each wheel of a four-wheeled vehicle, I can use two rails for the righthand wheels and two rails for the lefthand wheels of the vehicle, that is to say, I can use four long rails, two of which form supports for the inside halves or sections of the front and rear wheels and the other two forming supports for the outside halves or sections of said wheels.

From the foregoing it will be seen that a vehicle, traction engine, or agricultural machine which is provided with wheels and rails of the character above described, can travel over soft or sandy soil without sinking into same as the rails form a solid support for the wheels.

The exact construction of the wheels and rails is immaterial so far as my broad idea is concerned as my invention, broadly stated, consists in a vehicle or device of similar construction provided with rails on which the wheels of the vehicle travel and means for automatically moving said rails forward or in the direction in which the vehicle moves.

Having thus described my invention, what I claim as new and desire to secure by Letters Patent is:

1. A vehicle or similar device provided with a wheel which consists of two approximately segmental-shaped sections arranged in different vertical planes, rails arranged in alinement with each section of said wheel, a guide carried by the vehicle, and a flexible member connected to said rails and passing over said guide so that one rail will be moved in advance of the wheel while the other section of the wheel is traveling on its coöperating rail; substantially as described.

2. A vehicle provided with a wheel comprising two approximately segmental-shaped sections arranged side by side and in such a manner that they form a circular wheel, rails over which the sections of said wheel travel, a flexible member connected to said rails, and means moving with the vehicle and engaging said flexible member so that the rail for one section will be drawn forwardly while the other rail is held at rest by the section that is traveling over same; substantially as described.

3. A vehicle provided with a pair of wheels, each of which comprises two approximately segmental-shaped sections arranged in different vertical planes, a separate rail arranged in alinement with each section of each wheel, and a flexible member connected to the rails for each wheel and passing over a guide located in front of the wheel whereby the rail for one section is drawn forwardly while the other section of the wheel is traveling on its coöperating rail; substantially as described.

4. A vehicle provided with a pair of wheels, each of which comprises two approximately segmental-shaped sections arranged in different vertical planes, a coöperating rail for each section of said wheels, a flexible member connected to the rails for each wheel and passing over a guide so that the rail for one section will be drawn forwardly while the other section of the wheel is traveling over its coöperating rail, and guides for holding the rails for each wheel parallel; substantially as described.

5. A vehicle provided with a pair of wheels, the rim of each of which is composed of a plurality of sections that are located in different vertical planes, a plurality of parallel rails for each wheel, a yielding guide arranged in front of each wheel, and a flexible member passing over each of said guides and connected at its opposite ends to the rails; substantially as described.

6. A vehicle provided with a front axle and wheels, each of said wheels being composed of two approximately segmental-shaped sections that are arranged in different vertical planes, a pair of parallel rails arranged in alinement with each wheel, members projecting forwardly from the front axle and each carrying a guide, and a flexible device passing over each of said guides and connected at its opposite ends to the pair of rails for one wheel; substantially as described.

In testimony whereof I hereunto affix my signature, in the presence of two witnesses, this 25th day of September, 1907.

FRITZ KOCH.

Witnesses:
WALTER B. KEITER,
LOUIS K. J. KOCH.